Dec. 17, 1935.  G. R. LEWERS  2,024,589
TREATMENT OF MINERAL ABSORBENT MATERIAL
Original Filed May 15, 1929  2 Sheets-Sheet 1
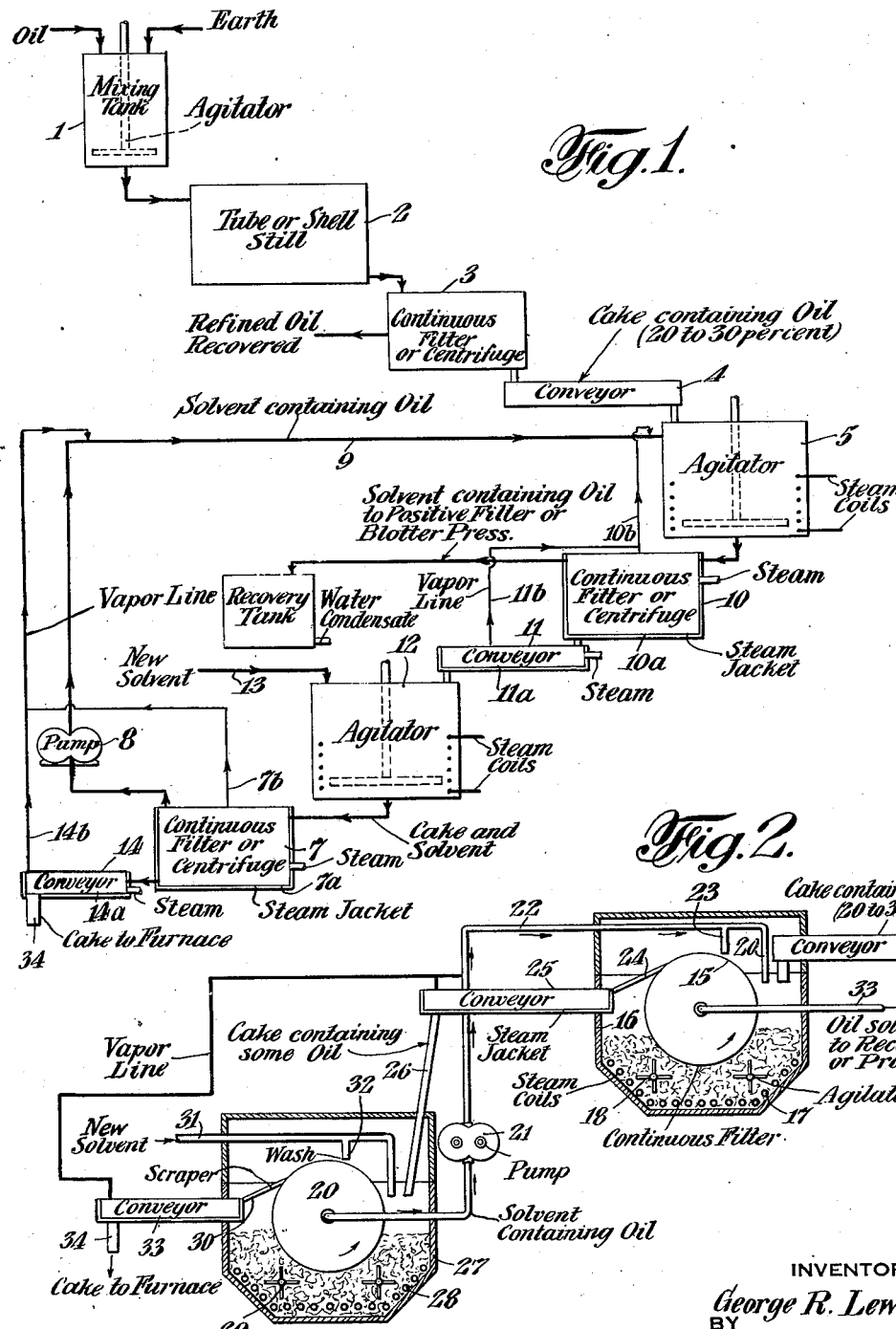
INVENTOR
George R. Lewers
BY
Ward Crosby & Neal
ATTORNEYS Dec. 17, 1935. G. R. LEWERS 2,024,589
TREATMENT OF MINERAL ABSORBENT MATERIAL
Original Filed May 15, 1929 2 Sheets-Sheet 2
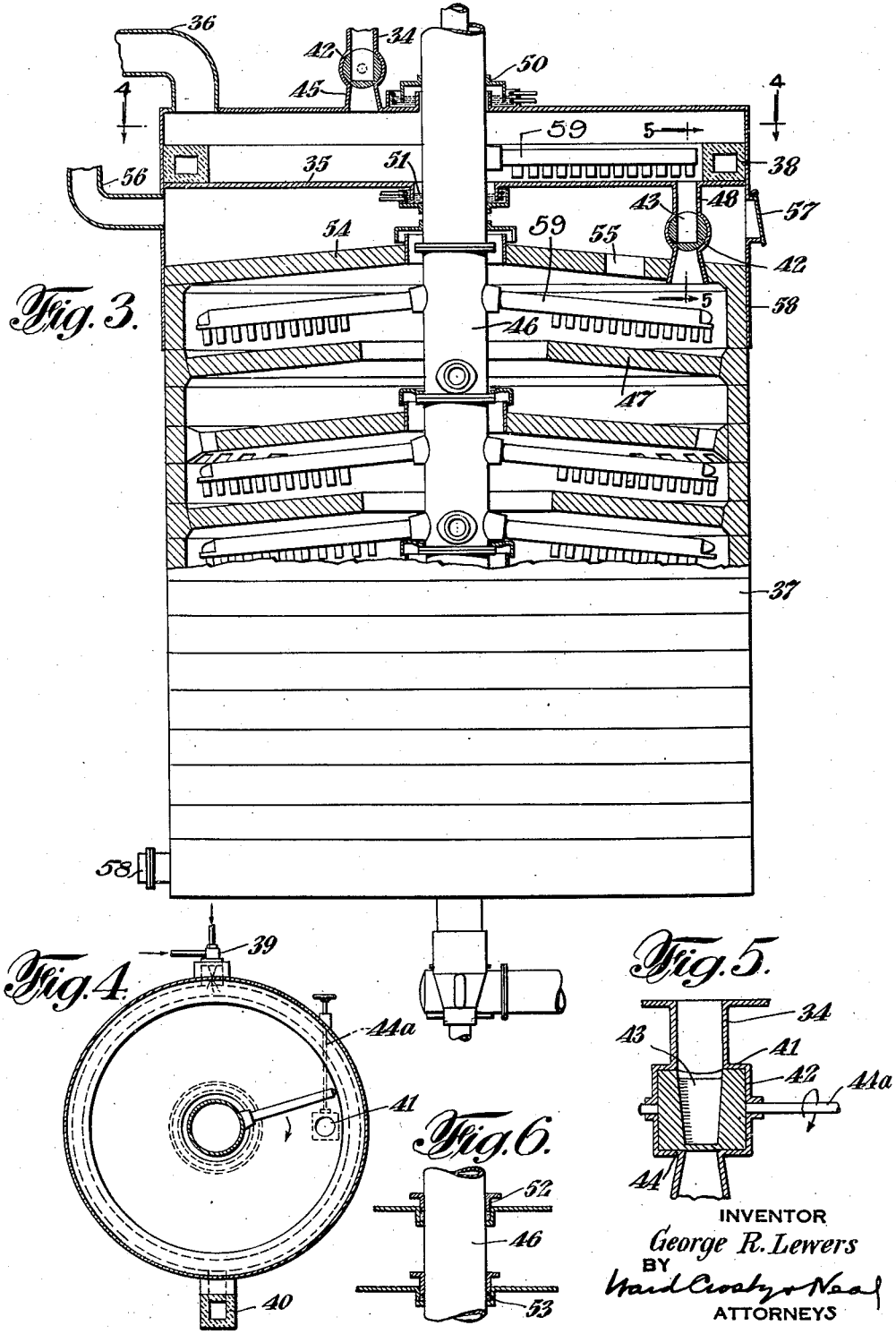
INVENTOR
*George R. Lewers*
BY
*Ward Crosby Neal*
ATTORNEYS Patented Dec. 17, 1935

2,024,589

UNITED STATES PATENT OFFICE 2,024,589

TREATMENT OF MINERAL ABSORBENT MATERIAL

George R. Lewers, Elizabeth, N. J., assignor, by mesne assignments, to Nichols Engineering and Research Corporation, New York, N. Y., a corporation of Delaware Application May 15, 1929, Serial No. 363,154
Renewed October 19, 1934

7 Claims. (Cl. 202—104)

This invention relates to the treatment of mineral absorbent materials after the same have been used for the treatment of oil, to recover oil therefrom and to reactivate said materials. A division of this application Ser. No. 23,350, filed May 25, 1935, relates to the refining of oil by the use of mineral absorbent materials and the recovery of oil from such material in connection with the refining steps.

A process has been heretofore proposed for carrying out such refining, but the amount of earth that may be used in it is limited on account of the type of apparatus employed and this has resulted in the production of oil which still retained substances giving it an undesirable color. This prior proposed treatment also employed a cumbersome and expensive method for removing the oil content from the earth after that content had been reduced to about 30% more or less. The proposed treatment involved the use of expensive extraction apparatus and was performed not continuously but as a batch process and required the use of a highly volatile solvent which was expensive and caused special precautions to be taken to avoid fire. In addition when the earth was removed from this apparatus after extraction with the solvent and was to be treated for revivification due to the presence of portions of this solvent in the mass, handling of the mass in the open air was dangerous because of the possibility of explosion of the solvent if it were ignited by a spark or otherwise.

The process and apparatus hereinafter disclosed and as claimed in my said divisional application provide for efficiently doing away with the disadvantages noted in the above mentioned proposed process, and at the same time may be operated rapidly and continuously to produce a high yield of substantially entirely decolorized oil, if desired, with a minimum fire hazard. The objects of the invention claimed herein, include the provision of a simple efficient apparatus and method for the treatment of the earth for removal of the oil content and reactivation of the earth, after its use for the treatment of oil.

Further and more specific objects, features and advantages will clearly appear from the detailed description given below taken in connection with the accompanying drawings which form a part of this specification and illustrate, by way of example, embodiments of the invention.

The invention accordingly comprises the novel apparatus and combinations thereof, as well as the novel processes and steps of processes which may be carried out in such apparatus, specific embodiments of which are described herein by way of example only and in accordance with the manner in which I now prefer to practice the invention.

In the drawings, Fig. 1 is a flow sheet showing the process from the initial combination of crude oil and earth through to the production of a cake containing oil which is to be further treated for removal of this oil prior to reactivation;

Fig. 2 is a diagrammatic illustration of the arrangement of apparatus which may replace the devices shown in the latter half of the flow sheet of Fig. 1, that is from that part of the flow sheet where the agitator with steam coils is shown through to the end of the flow sheet;

Fig. 3 is an elevation partly in section of a Herreschoff furnace with muffle furnace mounted on top thereof for receiving the filter cake containing oil;

Fig. 4 is a cross section on the line 4—4 of Fig. 3 on a reduced scale;

Fig. 5 is a sectional detail view taken on the line 5—5 of Fig. 3 showing the rotating valve for discharging the cake; and Fig. 6 is a fragmentary sectional view showing the use of stuffing boxes instead of a mercury seal around the main shaft shown in Fig. 3.

In carrying out the process as shown in the flow sheet of Fig. 1, I mix crude oil with a suitable proportion of earth in finely divided form such as Filtrol, ground fuller's earth, or the like, preferably of a fineness so that 95% will pass a 200 mesh sieve. The crude oil and earth are mixed in a vapor-tight mixing tank I provided with a suitable agitator and as I prefer to carry out my process, the oil and earth are supplied continuously to this tank and the mixture is drawn off and allowed to flow through a tube or other still and filter arranged in cascade, placed so that the flow is by gravity therethrough. The oil and earth flow to a tube or still 2 in which they are heated to a sufficient temperature to cause decolorization to occur. This temperature will vary somewhat but I have found that with the crude oil from the Mid-Continent and Pennsylvania Districts with the limits of 80 to 120 parts of oil to 75 parts of finely ground Filtrol, the temperature of 230° C. to 350° C. will cause substantially complete decolorization; i. e., starting with an oil having a color value of 2000 on the Lovibond color scale. Using the proportion of earth and temperature mentioned I have been able to reduce the color to 10 on that scale. From the tube or still 2 the oil and earth pass by gravity to an Oliver or Laughlin filter 3 or other type of continuous filter or centrifuge from which the cake passes to a conveyor and the decolorized oil passes from the filter and is recovered. The proportion of earth and oil mentioned above is important because if a smaller amount of earth is used a corresponding decrease in the amount of color removed from the oil occurs. I prefer to remove as much color as possible from the oil and I accordingly prefer to employ the earth within the limits mentioned. Heretofore the proportion of earth employed has been considerably below these limits and the mixture of oil and earth has been handled by pumps and after the mixture has left the still it has been passed around through a heat-exchanger to give up the heat acquired from the still to the oil entering the still and thereafter has passed to the Oliver filter. I have found, however, that in using a larger proportion of earth that the mixture cannot be satisfactorily pumped in this manner and that if attempt is made to pass it through a heat-exchanger it clogs the interior and proper heat-exchange is not effected. I have found, however, in accordance with my invention that, even with the large proportion of earth employed for complete decolorization, the mixture will still pass through pipes and through the apparatus employed by gravity as long as the system is sufficiently cascaded to give a head to the mixture so that it will flow evenly and at the desired rate therethrough.

The cake coming from the filter on to the conveyor contains approximately from 20 to 30% of oil which is to be recovered. I have found that the recovery of this oil from the cake can be done by dry distillation but I find that material such as Filtrol and similar earths apparently act catalytically on the oil when it is heated, as in the process of distillation, to crack the oil and thus break down valuable constituents such as lubricating oils therein with consequent depreciation of the value of the products recovered by such distilling process. I therefore prefer to recover these oils by other means, which avoid to a large extent the cracking referred to.

It has been proposed in the past, as noted above, to take this oil cake and place it in an expensive still in batches of 5 to 6 tons held in internal filters in which it was treated with a highly inflammable volatile solvent, with which it was agitated for from 30 to 60 minutes and allowed to settle for a period ranging from 14 to 22 hours during which period decanting occurred and at the end of which period the cake containing a proportion of oil and of the solvent dropped out into the air and from there was taken to the reactivating plant. Thereafter another batch was put through the same procedure. It was a batch process and not functioning continuously, as my process functions as described below, this process was costly because of the time lost in changing from one batch to another. In addition considerable time was lost while decanting. The installation cost of the apparatus involved was also high as compared with the apparatus of my invention. In addition there was loss of solvent when the material was ejected from the digesting apparatus and the presence of this solvent in the air was a considerable fire-hazard.

Instead of such an apparatus and process, I prefer to deliver the cake containing 20 to 30% of oil from a conveyor 4 into a vapor-tight agitator 5 provided with a series of steam coils. The cake is there agitated with solvent at a temperature of about 30° C. to 50° C. Coming from the last continuous vapor-tight filter 7 provided with steam jacket or coils 7a shown in Fig. 1, being pumped through pump 8 and line 9 to the agitator 5. This solvent contains some oil and is continuously fed to the agitator in desired proportion to remove oil from the cake which is continuously fed from the conveyor 4 to the agitator. The amount of solvent will vary with the percentage of oil in the cake. I have found that with a cake containing 20 to 30% oil that the solvent should be present in the agitator to the extent of one part of the cake by weight to about one part of solvent. The rate of supply is of course controlled by the rate of introduction of new solvent which occurs at a later stage in the process.

After agitation of the solvent and cake the mixture passes to a vapor-tight continuous filter or centrifuge 10, provided with steam jacket, coils or both 10a, the solvent removed by this means being passed to a positive filter such as a Dorco filter or blotter press where remaining traces of the clay are taken out which may be collected and returned from time to time to the agitator 5. The solvent plus oil then goes to a recovery tank 6.

The cake coming from the filter 10 passes by a conveyor 11 provided with a steam jacket or coils 11a, to a second vapor-tight agitator 12 where new solvent is added through a line 13 at a desired rate as mentioned above, the cake and solvent being maintained at 30 to 50° C. by steam coils within the agitator 12. The cake being continuously supplied by the conveyor 11 to the agitator is mixed with new solvent and continuously passes to the continuous filter or centrifuge 7 where the solvent containing oil is separated and passes back through the pump 8 and line 9 to the agitator 5. The cake passes to the furnace through a conveyor 14 provided with steam coils or steam jacket 14a. The steam jackets or coils 10a, 11a, 7a and 14a are provided in order to apply heat to the materials which are being acted on by the continuous filter or centrifuge 10, conveyor 11, continuous filter or centrifuge 7 and conveyor 14 respectively. The steam entering these jackets or coils will ordinarily be at 120 lbs. pressure approximately, while oils such as herein mentioned are being treated. By the use of air or mercury instead of steam, higher temperature may be secured if desired.

The action of these steam jackets or coils is to drive off from the mixture of clay and oil, some of the oil which is volatile at the temperature provided by the steam or other medium employed. The oil vapor thus produced is taken off by pipes 10b, 11b, 7b and 14b respectively from the continuous filter or centrifuge 10, conveyor 11, continuous filter or coil 7 and conveyor 14. As shown the pipes all lead to the solvent line 9 where the vapors combine with the solvent and pass into the agitator 5. Instead of or supplementing the steam coils, steam—as live, exhaust or superheated steam—may be introduced into the interior of the cylinder of the filters 10 and 7 and into conveyors 11 and 14. Any condensed steam in the interior of the cylinder of filter 10 will pass to the recovery tank and the condensed water may be drawn off. Steam passing into the vapor lines 10b, 11b, 7b and 14b will eventually find its way to the recovery tank and be removed.

The new solvent which I prefer to introduce through the pipe 13, is a blending naptha having about the following characteristics:—specific gravity 62° (A. P. I.); final boiling point 400° F.; initial boiling point 90-100° F. I prefer to have a naptha which has a boiling point for a large proportion thereof at an intermediate range between 100° and 400° F., and the less the amount of oil distilling at the lowest and highest figures of the range, the better. I may also use, if I desire, solvent which is more volatile than the above blending naptha, but in general such solvents are apt to be more expensive and losses thereof are correspondingly more expensive in the operation of the process. I can use for example as solvent a petroleum distillate having a specific gravity of 68.3° (A. P. I.), initial boiling point 140° F., final boiling point 212° F. and containing less than 2% aromatics.

Instead of the separate agitator and steam coils and continuous filter, these pieces of apparatus may be combined into single units as shown in Fig. 2 for carrying out the process. When so combined the continuous filter 15 is cased in the vapor-tight housing 16 in the lower part of which are steam coils 17 and two sets of agitators 18. The cake containing 20 to 30% oil is fed in from a conveyor through the conveyor 19 and is there agitated with solvent containing some oil coming from the filter 20 of the second stage of the process and conveyed through the pump 21 in line 22 to the housing 16. A branch line 23 feeds the solvent containing oil on to the cylinder 15 serving to wash the cake thereon. The cake from the cylinder 15 is scraped off by scraper 24, passed to a conveyor 25 which delivers it through pipe 26 to the vapor-tight housing 27 around the filter 20. This housing is similarly provided with steam coils 28 and agitators 29. The cake formed is scraped off by a scraper 30 and removed by a conveyor to be introduced into the furnace as will be described below. The filter 20 and housing 17 are provided with new solvent through a pipe 31 which delivers into the housing 27 and has a branch line 32 which serves to wash the cake on the filter 20. The solvent plus oil from the filter 15 passes out by a line 33 to a solvent recovery or for processing.

After passing from the conveyor at the end of each of the systems shown in Figs. 1 and 2, the cake normally contains approximately 1% or more of oil, the remaining 99% having been taken out by the processes so far mentioned. This cake passes by pipe 34 in each of Figs. 1 and 2 through a rotary valve which will be described below on to a hearth of a distilling muffle furnace 35 which is suitably heated to about 300° C. and from which the remainder of the oil and any solvent are driven off by distilling through a pipe 36 and recovered.

Instead of extracting oil from the cake coming from conveyor 4, by treatment with solvent as indicated, the cake containing 20 to 30% oil may be placed directly in the muffle furnace and distillation of the oil effected, but by this means the oil remaining in the cake is not recovered as it is in the process using agitation and filtering as described. Instead the oil tends to break down on heating in the presence of the clay, as previously mentioned, and to produce somewhat less desirable distillation products.

After treatment in the muffle furnace, the cake substantially free from oil and solvent is then passed through a rotary valve similar to the one to the entrance of the muffle furnace on to the top hearth of a rotary multiple hearth Herreschoff furnace such as described in the patent to D. Baird No. 1,375,346. In passing through the multiple hearth furnace, the material is reactivated by being brought into contact with highly heated air which causes combustion of the carbonaceous matter other than the oil and solvent still remaining in the clay thereby causing reactivation of the clay to occur. The clay then descends to the bottom of the furnace and is removed through a suitable exit and is then ready for use again starting at the first part of the process as shown at the top of the flow sheet in Fig. 1.

Referring now to Figs. 3 and 4 on top of a multiple hearth furnace designated as 37 preferably of the Herreschoff type, although other types of a multiple hearth furnace may be employed, is mounted the muffle furnace 35 which is circular in form and of substantially the same diameter as the Herreschoff furnace. This furnace is heated by an annular flue 38 of carborendum or other suitable fire-resistant material which lies on the outer edge of the floor of the furnace. An oil burner 39 projects into the flue 38 and the products of combustion therefrom on their way to the exit flue 40 heat the material in the muffle furnace.

The rotary valve for supplying material from pipe 34 to the hearth of the furnace is shown more clearly in Fig. 5. It comprises a casing 41 substantially cylindrical in form and tightly fitting within the casing a cylinder 42 having a rectangular opening 43 forming the mouth of a chamber of about the cross-sectional dimensions of the opening, having a depth of the diameter of the casing and lying transverse to the axis thereof. When the opening is in communication with pipe 34 the chamber may be filled. This same opening permits the discharge of the chamber when it is rotated through 180° so that it is in communication with a pipe 44 therebelow which is slightly flared and which is fastened to the roof of the furnace 35 and communicates by an opening therethrough with the interior of the furnace. The cylinder is rotated at suitable intervals to receive charge from the pipe 34 and to discharge it into the muffle furnace by means of a shaft 44a which is rotated by an outside source of power not shown. In view of the tight fit of the cylinder in the casing and exclusion of air from the cylinder when it is full of the cake discharged into it through pipe 34, no air is admitted into the muffle when the cake is discharged through pipe 45 into it. It is important that air be excluded in order to avoid burning of oil entering the muffle. The usual central shaft of the multiple-hearth furnace 46 is extended upwardly through the muffle furnace and carries on it an arm 59 of the usual type by which material in the muffle furnace is agitated and finally moved to the exit pipe 48 in the floor of the muffle furnace. This exit also has an air-tight value associated with it so that material can be dumped from the muffle furnace on to the upper hearth 47 of the multiple-hearth furnace. This rotating valve is identical as here shown with that shown in Fig. 5.

In order to provide an air-tight seal between the shaft 46 and the upper and lower walls of the muffle furnace through which it passes, water-cooled mercury seals 50 and 51 are placed respectively about the shaft where it enters the upper and lower walls. Instead of the mercury seal as shown in Fig. 6 ordinary stuffing boxes 52 and 53 may be used respectively for preventing the admission of air to the muffle furnace.

In the roof 54 of the multiple-hearth furnace an exit for heated gases passing through the furnace is provided and designated 55. The exit for these gases is preferably placed as indicated so that the gases may serve for the heating of the bottom of the muffle furnace passing through the space between the roof 54 of the multiple-hearth furnace and the bottom wall of the muffle furnace, and then out through an exit 56. In order that the amount of heat supplied to the bottom of the muffle furnace in this way may be regulated, a flue 57 is provided in the extension of the side wall 58 of the muffle furnace by which the furnace is supported on top of the Herreschoff furnace. By opening this flue, air may be admitted to cool the gases of combustion passing through the space between the muffle and the multiple-hearth furnace.

In operation the apparatus shown in Figs. 3 to 6 is as follows:—Material is fed through the pipe 34 to the hollow cylinder 42 rotating and discharging at intervals into the interior of the muffle furnace. The oil burner 39 having been previously started to heat the muffle furnace, the latter heats the charge on the floor thereof and drives off the oil remaining in the cake fed through 34. This oil passes off to a suitable recovery apparatus. The shaft 46 having been put in motion, the arm 59 passes material to the exit 48 through which it is delivered by the rotating valve connected therewith on to the hearth 47 of the Herreschoff furnace, from which it is raked in the usual manner through the multiple-hearth structure to an exit at the bottom. In first starting up the furnace, torches are applied to bring it up to heat and thereafter air admitted through air inlet port 58 in the usual manner into the interior of the furnace through controlled air openings causes combustion of the carbonaceous material still retained in the cake, thereby supplying sufficient heat to maintain the temperature of fresh cake falling to the hearths at a high enough point to continue combustion.

The process and apparatus described are simple and efficient. They function continuously and rapidly and hence are adapted to handle large quantities of material within a short period. There is a minimum fire-hazard due in part to the use of less inflammable solvents than are required in the prior process described above and in part to the handling of material containing inflammable oil in vapor-tight chambers to avoid such combustion. The avoidance of such combustion not only minimizes the fire-hazard, but also saves loss of such combustible materials. An oil may be recovered by this treatment having a substantially water-white purity.

The term "earth" as herein used is intended to include fuller's earth, diatomaceous earths, such as kieselguhr, Filtrol, and similar materials used for the treatment of oil.

While I have described my improvements in detail and with respect to preferred forms thereof, I do not desire to be limited to such details or forms, since many changes and modifications may be made and the improvements embodied in widely different forms without departing from the spirit and scope of the invention in its broader aspects. Hence I desire to cover all modifications and forms coming within the language or scope of any one or more of the appended claims.

What I claim is:

1. In a furnace of the character described, in combination, a multiple hearth combustion furnace comprising a series of superposed hearths for series flow of solid material from one to another, a substantially air tight muffle furnace above the multiple hearth furnace, a vertically arranged shaft passing centrally through both the multiple hearth and muffle furnaces, rabble arms for the hearths of the combustion furnace and for the muffle furnace, carried by the shaft, two valved means, substantially gas tight, for admitting material into the muffle furnace and for discharging it from the muffle furnace onto the uppermost hearth of the combustion furnace, a partition spaced below the floor of the muffle furnace and forming a top for the combustion furnace, a chamber just below the floor of the muffle furnace, the bottom of the muffle furnace forming the top of said chamber and said partition forming the bottom of said chamber, the partition being for the most part imperforate but provided with at least one opening for the passage of hot gas into said chamber, and separate gas exits from the muffle furnace and said chamber.

2. In a furnace of the character described, in combination, a multiple hearth combustion furnace comprising a series of superposed hearths for series flow of solid material from one to another, a substantially air tight muffle furnace spaced below the multiple hearth furnace, a chamber defined between and by the floor of the muffle furnace and the top of the combustion furnace, means for conveying gas from the uppermost hearth of the combustion furnace into said chamber, a controllable air inlet for the direct admission of cooling air to said chamber for preventing overheating of the floor of the muffle furnace, a vertically and centrally arranged shaft passing through both the multiple hearth and muffle furnaces, rabble arms for the hearths of the combustion furnace and for the muffle furnace, carried by the shaft, two valved means, substantially gas tight, for admitting material into the muffle furnace and for discharging it from the muffle furnace onto the uppermost hearth of the combustion furnace, and separate gas exits from the muffle furnace and from said chamber.

3. In an apparatus of the kind described, in combination, a multiple hearth combustion furnace comprising superposed hearths for series flow of solid material from one to another, a muffle furnace for distilling in communication with the interior of said multiple hearth furnace through a discharge conduit therefrom, and a chamber between said muffle furnace and said multiple hearth furnace, said muffle furnace and chamber being adapted for heat exchange with one another through a wall common to said muffle furnace and said chamber.

4. In an apparatus of the kind described, in combination, a multiple hearth combustion furnace containing a series of superposed hearths for series flow of solid material from one to another mounted about a rotatable shaft, a substantially air-tight muffle furnace on top of said multiple hearth furnace comprising a device for heating said muffle furnace, valves for admitting and discharging material respectively into and from said muffle furnace while substantially excluding air therefrom, a stirrer arm on said shaft for stirring the material charged into said muffle furnace, an exit from said muffle furnace for liberating oil distilled from cake containing oil charged thereinto, and a device for heating the bottom of said muffle furnace by gases passing from said multiple hearth furnace along the bottom of said muffle furnace.

5. Apparatus for the treatment of mineral absorbent material, comprising in combination, a distilling muffle furnace for heating a mixture containing oil and spent mineral absorbent material, a combustion furnace for burning combustible material remaining in said mixture and located below said distilling muffle furnace, an exit pipe for conveying distillate from said muffle furnace, means for introducing said mixture in said muffle furnace and for conveying the mixture from said muffle furnace into said combustion furnace, said means having an air-tight connection with the walls of said muffle furnace in its receiving, delivering and intermediate positions, rabbling arms for stirring the mixture in said muffle furnace and in said combustion furnace, a common shaft extending through the walls of said muffle furnace for supporting and operating said rabbling arms, an air-tight connection between said shaft and the walls of said muffle furnace, a partition arranged between said muffle and combustion furnaces and forming a heating chamber with the bottom wall of said muffle furnace, said partition being perforated whereby gases of combustion may be admitted to said chamber from said combustion furnace, and means for admitting air to said chamber to control the temperature within said muffle furnace.

6. A process for recovering oil from finely divided absorbent earth containing oil and other carbonaceous matter resulting from the use of the earth for the treatment of oil, and reactivating said earth, which consists in substantially continuously introducing said earth into a distilling zone, gradually advancing the earth as a layer through said zone while agitating the same, heating said zone to a temperature sufficient to vaporize the oil from the earth without substantial cracking of the oil, maintaining said zone sufficiently free of air to avoid combustion of said oil, withdrawing from said zone the oil as thus distilled from the earth, substantially continuously passing the earth after it is thus largely freed of oil, from said zone into a second heated zone substantially isolated against the passage of gases therefrom to said first mentioned zone, and gradually advancing the finely divided earth as a layer through said second zone while agitating the same in the presence of a stream of oxidizing gas, at a temperature causing combustion of said carbonaceous matter and reactivation of the earth.

7. A process for recovering oil from finely divided absorbent earth containing oil and other carbonaceous matter resulting from the use of the earth for the treatment of oil, and reactivating said earth, which consists in substantially continuously introducing said earth into a distilling zone, gradually advancing the earth as a layer through said zone while agitating the same, heating said zone to a temperature in the neighborhood of 300° C. to vaporize the oil from the earth, maintaining said zone sufficiently free of air to avoid combustion of said oil, withdrawing from said zone the oil as thus distilled from the earth, substantially continuously passing the earth after it is thus largely freed of oil, from said zone into a second heated zone substantially isolated against the passage of gases therefrom to said first mentioned zone, gradually advancing the finely divided earth as a layer through said second zone while agitating the same in the presence of a stream of oxidizing gas, at a temperature causing combustion of said carbonaceous matter and reactivation of the earth, and utilizing heat from such combustion to heat said first named zone.

GEORGE R. LEWERS.